United States Patent [19]
Jacob et al.

[11] 4,126,666
[45] Nov. 21, 1978

[54] PROCESS FOR PRODUCING HIGH PURITY LITHIUM SULFIDE

[75] Inventors: Susan R. Jacob, Royersford; Patrick M. Brown, Exton, both of Pa.

[73] Assignee: Foote Mineral Company, Exton, Pa.

[21] Appl. No.: 872,310

[22] Filed: Jan. 25, 1978

[51] Int. Cl.$^2$ .................. C01B 17/22; C01D 15/00
[52] U.S. Cl. .............................. 423/561 A; 423/179.5
[58] Field of Search ...................... 423/561 A, 179.5

[56] References Cited

U.S. PATENT DOCUMENTS

| | | | |
|---|---|---|---|
| 2,840,455 | 6/1958 | Dwyer | 423/179.5 |
| 3,615,191 | 10/1971 | Bach et al. | 423/561 A |
| 3,642,436 | 2/1972 | Smith, Jr. | 423/561 A |
| 3,857,920 | 12/1974 | Granthan et al. | 423/179.5 |

OTHER PUBLICATIONS

Hadek et al., Lithium & its Compounds, Industrial and Engineering Chemistry, vol. 43, #12, Dec., 1951, pp. 2636–2646.

Primary Examiner—O. R. Vertiz
Assistant Examiner—Gary P. Straub
Attorney, Agent, or Firm—Howson and Howson

[57] ABSTRACT

Lithium sulfide in the form of a finely divided, free-flowing powder of high purity is produced by reacting lithium carbonate powder in which the diameter of the particles is in the range of 1 to 10 microns with hydrogen sulfide at 500° to 700° C. Initial contact of the lithium carbonate with hydrogen sulfide takes place at a temperature substantially below the sintering temperature of lithium carbonate which is approximately 300° to 400° C.

3 Claims, 6 Drawing Figures

FIG. 5
FIG. 6
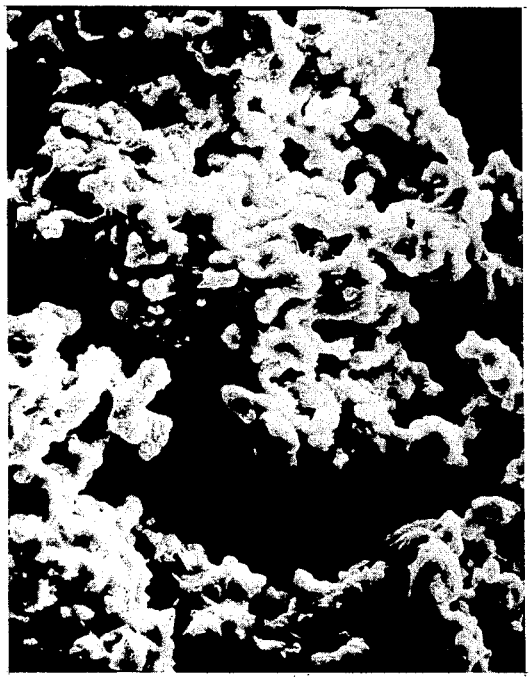

PROCESS FOR PRODUCING HIGH PURITY LITHIUM SULFIDE

BACKGROUND OF THE INVENTION

In view of the limited reserves of oil of oil-importing nations, such as the United States, and the ever increasing cost of importing this presently essential fuel source, a need has arisen for new rechargeable battery systems which are high in both specific energy and specific power, and which, for example, could be used in the transportation field to propel automobiles and other vehicles. By use of such batteries, transportation energy use could be shifted, at least in part, from imported oil to coal and nuclear energy. Such battery systems might also be used by the utility industry for storing electric power and using it in periods of peak demand to smooth the generating load, so that the need for burning petroleum fuels for the generation of peaking power is reduced.

A promising battery for the above-stated purpose is an uncharged cell, the positive and negative electrodes of which are prepared from a mixture of iron powder and lithium sulfide ($Li_2S$) for the positive electrode and a porous aluminum plaque for the negative electrode. Upon charging, the lithium in the positive electrode is electro-chemically transferred to the negative electrode, forming a lithium-aluminum alloy, and in the positive electrode the sulfur from the $Li_2S$ forms FeS or $FeS_2$ depending upon the cell charging voltage.

In preparing batteries of this type it is essential that the $Li_2S$ be of extremely high purity and be in the form of a finely divided flowable powder whereby it can be intimately and uniformly mixed with the iron powder.

Various processes have been suggested for production of high purity lithium sulfide. These include reaction of lithium ethoxide and hydrogen sulfide; lithium metal with hydrogen sulfide in organic solvents such as diethyl ether or tetrahydrofuran; lithium sulfate with hydrogen, and lithium metal with sulfur in the presence or absence of a solvent. These several processes have one or more drawbacks, such as slow reaction rate, impure product and cost. Reactions run in organic solvents have the disadvantage in that complete solvent removal is difficult, and poor filtration characteristics frequently make the processes impractical and costly.

SUMMARY OF THE INVENTION

This invention pertains to a process for the production of high purity lithium sulfide. By high purity is meant that the lithium sulfide product has a purity of at least about 98%. In addition, by reason of the novel process conditions employed in the process, the product is in the form of a finely-divided, free-flowing powder, rather than a mixture of larger agglomerates resulting from the sintering together of lithium carbonate particles prior to the lithium being converted to the corresponding sulfide.

Sintering together of lithium carbonate particles takes place at temperatures as low as 300°–400° C., and first occurs at the surface of the particles where a hard crust forms in the early stages of the reaction. The final result of such sintering is the formation of relatively large agglomerates which do not disintegrate during the sulfiding reaction. Rather, under the relatively high sulfiding temperatures employed in the process, i.e. after the carbonate reactant has reached temperatures on the order of 500° C. to 700° C., a hard cake of lithium sulfide is formed, which cake can only be removed from the reactor with difficulty after being broken up into smaller pieces. Even then in the absence of an expensive comminution step, the lithium sulfide product does not have a fine relatively uniform particle size required for use in rechargeable batteries.

It was discovered that if prior to carrying out the relatively high temperature sulfiding reaction, lithium carbonate particles having a particle diameter in the range of 1 to 10 microns are contacted with hydrogen sulfide gas at a temperature substantially below the sintering temperature of the lithium carbonate particles, e.g. temperatures on the order of about 150° to 175° C., the sintering together of the particles of lithium carbonate reactant is avoided. Apparently the surface layers of the carbonate particles are converted to sulfide even under these relatively mild reaction conditions. Since the sintering temperature of lithium sulfide is not only substantially higher than the corresponding carbonate, but also above the sulfiding temperature, being about 800° C., the sulfide product of the present process is not in the form of agglomerates of particles which have been sintered together, but is in the nature of a relatively free-flowing powder of substantially uniform small particle size.

DESCRIPTION OF THE DRAWINGS

FIGS. 4, 5 and 6 are scanning electron photomicrographs at the three different magnifications of FIGS. 1 to 3, respectively, showing the sintered lithium sulfide product obtained in the absence of the low temperature $H_2S$ pre-treatment step of the present invention.

DESCRIPTION OF THE PREFERRED EMBODIMENTS

Figure 1:
FIGS. 1, 2 and 3 are scanning electron photomicrographs at three different magnifications of lithium sulfide produced according to the process of this invention.

In the process of the present invention, the lithium carbonate reactant is in the form of very finely-divided particles, substantially all of the particles having a particle diameter of less than about 15 microns, and on the order of at least about 96% having a particle diameter in the range of about 1 to 10 microns, as determined by Coulter Counter Analysis. Preferably, the major portion of the particles, e.g. at least about 85% of the particles have a particle diameter in the range of about 2 to 6 microns. A particle size analysis of a preferred fine powder lithium carbonate reactant for use in the present invention is set forth in Table I, below:

TABLE I

| COULTER COUNTER ANALYSIS | |
|---|---|
| Diameter Range in Microns | Weight Percent of Material Within Particle Size Range |
| .63–.793 | .1 |
| .794–.999 | .3 |
| 1.000–1.259 | .4 |
| 1.260–1.586 | 1.0 |
| 1.587–1.999 | 3.1 |
| 2.000–2.519 | 9.6 |
| 2.520–3.174 | 19.8 |
| 3.175–3.999 | 33.6 |
| 4.000–5.039 | 20.9 |
| 5.040–6.349 | 5.2 |
| 6.350–7.999 | 1.6 |
| 8.000–10.099 | 1.2 |
| 10.100–12.699 | 1.1 |
| 12.700–15.999 | 1.0 |
| 16.000–20.199 | .6 |
| 20.200–25.399 | .3 |
| 25.400–31.999 | .2 |

TABLE I-continued
COULTER COUNTER ANALYSIS

| Diameter Range in Microns | Weight Percent of Material Within Particle Size Range |
|---|---|
| 32.000–40.299 | 0 |
| 40.300–50.799 | 0 |
| +50.800 | 0 |

It was discovered that the use of such finely-divided lithium carbonate particles, by reason of their relatively large surface area, increases reaction rate, yield and purity of product.

Prior to contacting the lithium carbonate powder with hydrogen sulfide gas, the powder is pre-heated to modestly elevated temperatures on the order of about 150° to 175° C. in the presence of an inert gas, such as argon. Such pre-heating step removes moisture, and the moderate temperatures involved are sufficient to cause the hydrogen sulfide, which is subsequently introduced into the reactor after purging with an inert gas, to react with the lithium carbonate at least at the surface of the particles thereof to convert the surface to lithium sulfide, whereby sintering together of the lithium carbonate particles is avoided.

Following the pre-treating step, the lithium carbonate reactant is heated to sulfiding temperatures on the order of about 500° to 700° C. while hydrogen sulfide gas is passed in contact therewith for a period of about 1 to 4 hours. Passage of hydrogen sulfide gas into contact with the lithium carbonate powder can be carried out while the lithium carbonate is being heated from the pre-treatment temperature of about 150° to 175° C. to the sulfiding temperature. By so doing, total reaction time may be somewhat reduced. At temperatures substantially below 500° C. or using relatively short reaction times relatively high yields of Li in excess of about 99% are realized with some sacrifice in purity of the product.

Yield of $Li_2S$ product initially increases with reaction time, but then decreases by reason of the losses of product due to volatilization thereof, particularly where reaction temperatures at the upper end of the reaction temperature range are employed. Preferred conditions of reaction temperature and reaction time to obtain high yield of pure product are about 600° to 700° C. and about 2 to 4 hours, respectively.

In order to obtain high yields of a relatively pure lithium sulfide product, the stoichiometric ratio of hydrogen sulfide to lithium carbonate should be at least one part by weight of the former to one of the latter, seven parts, by weight of the former for each part by weight of the latter being preferred. The hydrogen sulfide can be caused to contact the particulate lithium carbonate in various ways, as for example by having the solid reactant in the form of a fixed bed or fluidized bed.

Figure 2:
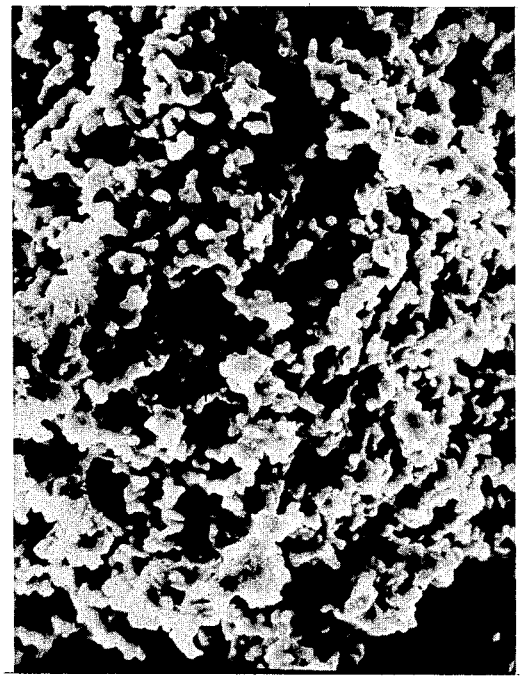
Figure 3:
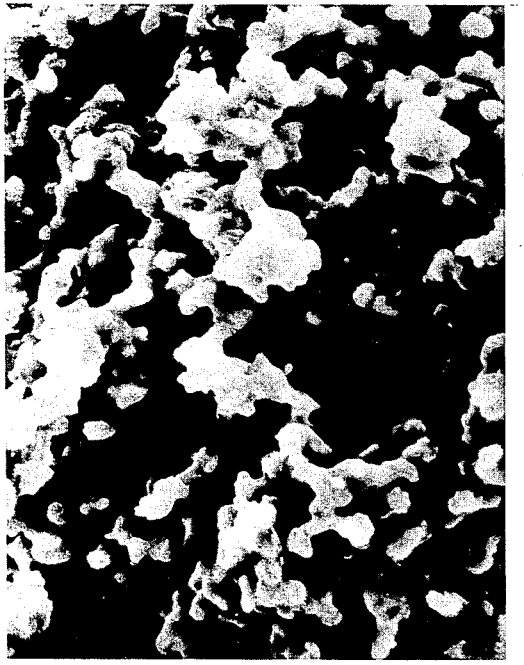
Figure 4:
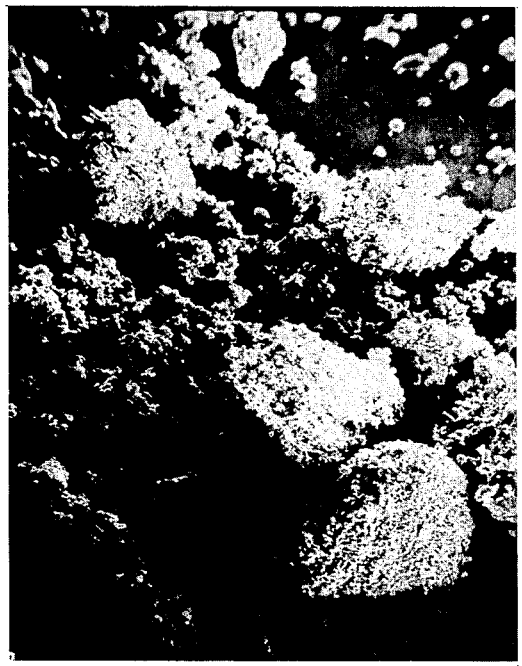

The lithium sulfide product of this invention is illustrated in FIGS. 1 to 3, inclusive, which are scanning electron photomicrographs at magnifications of 42×, 400× and 800×, respectively. As can be seen by reference to these figures, the product is a relatively free-flowing powder of fine relatively uniform particle size with little or no, e.g. less than 5%, sintering together of the particles. By way of contrast, FIGS. 4 to 6, inclusive, are similar photomicrographs of lithium sulfide prepared without the initial pretreatment step of the process of this invention. It will be noted that the particles are sintered together into fused agglomerates.

The invention will be more fully explained by the following examples.

In the examples, the apparatus comprised a tube furnace having an alumina tube as the reactor, and fitted with fused alumina combustion boat for containing the solid lithium carbonate reactant. A thermocouple insulated with a ceramic material was positioned directly beneath the alumina tube in the hot zone of the furnace for temperature control. A controller was utilized to maintain the furnace at a predetermined temperature. The thermocouple, which gave a rapid response from the furnace, was used to adjust readings on a second thermocouple which was encased in a thin high silicon glass tube suspended above the surface of the solid reactant. Both ends of the alumina tube were sealed off, but entrance and exit ports were adapted as inlet and outlet for gases and to accommodate the encased thermocouple.

The system was maintained under argon during heating and cooling periods.

In each test the following procedure was employed:

The fused alumina combustion boat was tared and filled with a known quantity of powdered $Li_2CO_3$ which had been dried at 110° C. The combustion boat was placed a standard distance into the hot zone of the alumina tube and sealed off with rubber stoppers. The thermocouple within the silicon glass tube was attached to a potentiometer. Argon was passed through the system for 20–30 minutes to purge the system of air. The controller was then set at the selected temperature and the heating of the furnace was begun.

When the furnace reached the desired temperature, reagent gas was added and argon turned off, unless otherwise noted.

The hydrogen sulfide reagent was introduced at a specified rate for a given time period. After the experiment was completed, argon was introduced in place of the hydrogen sulfide reactant and the furnace was permitted to cool to room temperature.

After the product had cooled to room temperature, it was removed to a glove bag under argon and placed in a sealed container. The tared container and $Li_2S$ product were weighed and analyses of percent $S^=$, $CO_3^=$ and Li were obtained. Purity and yield were calculated from these weights and analyses.

EXAMPLE 1

The apparatus and procedure described above were used, the reactor temperature being 600° C. The $Li_2CO_3$ had the particle size distribution as set forth in Table I, above. $H_2S$ was not introduced to the reactor until the above reaction temperature had been reached. The reaction time was 3 hours. The stoichiometric amount of $H_2S$ used was 7 parts by weight for each part by weight of $Li_2CO_3$. The product obtained is shown in the scanning electron photomicrographs FIGS. 4 to 6, inclusive. As noted above, these figures show that the $Li_2S$ product is a sintered material and is highly agglomerated. At greater magnification (see FIG. 6), the degree of sintering is more obvious, with rounded edges giving an amorphous appearance to the sintered material.

EXAMPLE 2

The procedure of Example 1 was repeated with the exception that introduction of $H_2S$ was begun when the $Li_2CO_3$ had reached a temperature of about 150° C. and was continued while the reactor was being heated to 600° C. The reactor was maintained at the latter temperature for 3 hours while introduction of H₂S was continued. The product obtained was a finely-divided powder with less than 5% of the particles being sintered. This product is shown in FIGS. 1 to 3.

What is claimed is:

1. A process for producing lithium sulfide of at least about 98% purity which comprises initially contacting lithium carbonate powder composed of particles having a particle diameter in the range of about 1 to about 10 microns with hydrogen sulfide at a temperature in the range of about 150° to about 175° C., and then heating the lithium carbonate to a temperature in the range of about 500° to about 700° C. and while at said temperature contacting said lithium carbonate with hydrogen sulfide for a period of from about 1 to about 4 hours.

2. The process according to claim 1, in which at least 85 percent by weight of said lithium carbonate particles have a diameter in the range of about 2 to 6 microns.

3. The process according to claim 1, in which the lithium carbonate is heated to about 600° to 700° C. and is contacted with hydrogen sulfide at said temperatures for about 2 to 4 hours.

* * * * *